United States Patent
Takano et al.

(10) Patent No.: US 6,903,745 B2
(45) Date of Patent: Jun. 7, 2005

(54) IMAGE PROCESSING APPARATUS AND IMAGE PROCESSING METHOD

(75) Inventors: Gaku Takano, Yokohama (JP); Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/731,103

(22) Filed: Dec. 10, 2003

(65) Prior Publication Data

US 2004/0233205 A1 Nov. 25, 2004

Related U.S. Application Data

(60) Provisional application No. 60/471,335, filed on May 19, 2003.

(51) Int. Cl.$^7$ ................................. G09G 5/39
(52) U.S. Cl. ...................... 345/531; 358/536; 358/3.06; 358/1.16
(58) Field of Search ................. 345/501, 530, 345/531, 536; 358/1.13, 2.1, 1.16, 536, 1.9, 3.01, 3.06, 533, 3.08, 3.26

(56) References Cited

U.S. PATENT DOCUMENTS

| 4,630,125 A | * | 12/1986 | Roetling ..................... 358/3.08 |
| 5,777,759 A | * | 7/1998 | Kaburagi et al. ............ 358/536 |
| 6,256,107 B1 | * | 7/2001 | Toda .......................... 358/1.15 |
| 2002/0122191 A1 | * | 9/2002 | Kitagawara ................. 358/1.9 |
| 2003/0025954 A1 | | 2/2003 | Takano et al. |

FOREIGN PATENT DOCUMENTS

JP       9-93424 A       4/1997

* cited by examiner

Primary Examiner—Kee M. Tung
(74) Attorney, Agent, or Firm—Foley & Lardner LLP (57) ABSTRACT

An image processing apparatus has interpolation calculation means which outputs, based on an input image signal P7, a binary signal P8=0 or 1 by calculating a formula, P8=S[i](xl,yl) EXOR (DF(xl,yl) AND IP(xl,yl)), using a screen pattern S[i](xl,yl), a difference pattern DF(xla,yla) based on screen patterns S[i] and S[i+1], and an interpolation pattern IP(xla,yla).

20 Claims, 5 Drawing Sheets

IMAGE PROCESSING APPARATUS AND IMAGE PROCESSING METHOD

CROSS-REFERENCE TO RELATED APPLICATIONS

This application claims the benefit of U.S. Provisional Application No. 60/471,335, filed May 19, 2003.

BACKGROUND OF THE INVENTION

1. Field of the Invention

The present invention relates to an image processing apparatus and an image processing method, which are used in an image forming apparatus, such as a printer or a digital copying machine, wherein an image signal produced by reading an image of an original by image input means such as a scanner is subjected to image processing such as tone processing, and the processed image is printed out onto paper by binary image output means of, e.g., an electrophotographic type.

2. Description of the Related Art

In a conventional tone process wherein output pixel values (binary) are determined by comparison with threshold values that change cyclically as in a regular pattern dither method, only a screen pattern, which is output as an image and varies in a simple fashion relative to an input image signal, is produced. It is not possible, therefore, to form a screen pattern that varies in a complex fashion in accordance with a gray level of the input image signal. In addition, an enormous memory capacity is required to store binary screen patterns corresponding to all input image signals.

BRIEF SUMMARY OF THE INVENTION

The object of an aspect of the present invention is to provide an image processing apparatus and an image processing method, which can perform a tone process by forming, with use of a small-capacity memory, a variety of binary screen patterns which vary in a complex fashion in accordance with gray levels.

According to an aspect of the present invention, there is provided an image processing apparatus comprising: first signal generating means for generating a first signal on the basis of an input image signal; first memory means for storing a plurality of pattern data; read-out means for reading out first and second patterns stored in the first memory means, in accordance with the first signal generated from the first signal generating means; third pattern producing means for producing a third pattern on the basis of the first and second patterns read out by the read-out means; second signal generating means for generating a second signal on the basis of the image signal; second memory means for prestoring a fourth pattern; fifth pattern generating means for generating a fifth pattern on the basis of the fourth pattern stored in the second memory means and the second signal generated from the second signal generating means; position calculation means for calculating an intra-pattern position signal indicative of a position within the patterns; and interpolation calculation means for calculating, in accordance with the intra-pattern position signal calculated by the position calculation means, an output pixel value on the basis of a first pixel value within the first pattern corresponding to the intra-pattern position, a second pixel value within the third pattern corresponding to the intra-pattern position, and a third pixel value within the fifth pattern corresponding to the intra-pattern position.

According to another aspect of the present invention, there is provided an image processing method comprising: generating a first signal on the basis of an input image signal; prestoring a plurality of pattern data; reading out first and second patterns from the plurality of pattern data in accordance with the generated first signal; producing a third pattern on the basis of the read-out first and second patterns; generating a second signal on the basis of the image signal; prestoring a fourth pattern; generating a fifth pattern on the basis of the prestored fourth pattern and the generated second signal; calculating an intra-pattern position signal indicative of a position within the patterns; and calculating, in accordance with the calculated intra-pattern position signal, an output pixel value on the basis of a first pixel value within the first pattern corresponding to the intra-pattern position, a second pixel value within the third pattern corresponding to the intra-pattern position, and a third pixel value within the fifth pattern corresponding to the intra-pattern position.

Additional objects and advantages of an aspect of the invention will be set forth-in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of an aspect of the invention.

DETAILED DESCRIPTION OF THE INVENTION

Embodiments of the present invention will now be described with reference to the accompanying drawings.

Figure 1:
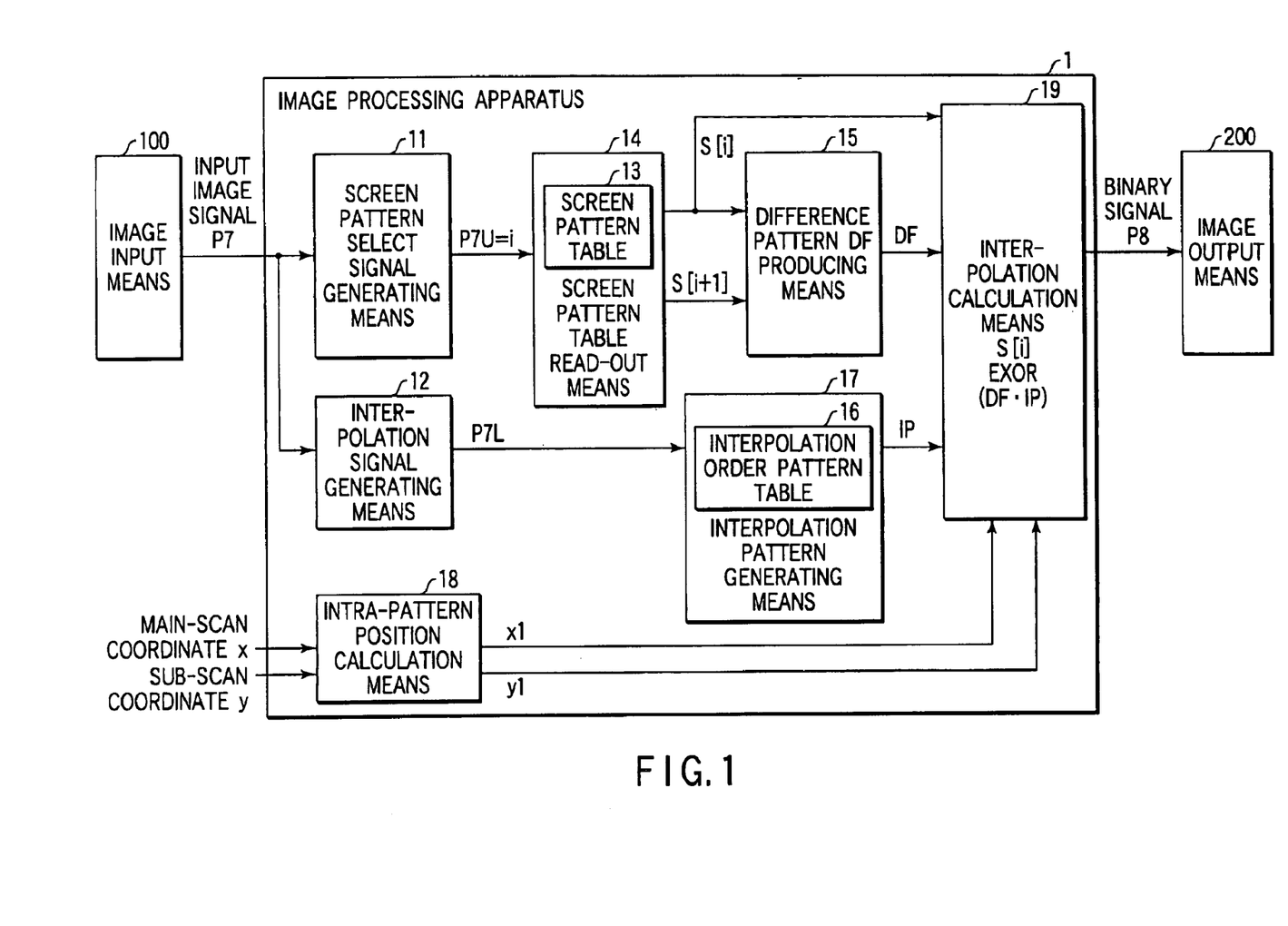
FIG. 1 is a block diagram showing an internal structure of an image processing apparatus according to a first embodiment of the present invention.

FIG. 1 shows the structure of a digital copying machine having an image processing apparatus according to a first embodiment of the present invention. The digital copying machine comprises image input means 100 such as a scanner, an image processing apparatus 1, and image output means 200 such as a printer.

The image processing apparatus 1 comprises screen pattern select signal generating means 11, interpolation signal generating means 12, a screen pattern table 13 & screen pattern table read-out means 14, difference pattern DF producing means 15, an interpolation order pattern table 16 & interpolation pattern generating means 17, intra-pattern position calculation means 18, and interpolation calculation means 19.

The image processing apparatus 1 performs a tone process according to the present embodiment for an input image signal P7, which has undergone image processing (not illustrated) such as image-quality adjustment and compression/decompression in the preceding stage of the above-described structure.

The screen pattern table 13 stores a plurality of screen patterns, S[i]i=0 to N−1. Each screen pattern S[i] is a table having n×m pixels, to which "0" or "1" is assigned. Value "0" indicates a white pixel, and value "1" indicates a black pixel. Coordinates in the screen pattern are expressed by (xla, yla), 0≦xla≦n−1, 0≦yla≦m−1. The coordinates (xla, yla) in the i-th screen pattern are expressed by S[i](xla, yla).

In the screen pattern table 13, screen patterns are set or changed by a CPU (not shown).

The screen pattern select signal generating means 11 generates a screen pattern select signal i, which is used to select screen patterns S[i] and S[i+1] on the basis of the input image signal P7. In the present embodiment, the input image signal P7 is an 8-bit signal. High-order bits P7U of the input image signal P7 are assigned to the screen pattern select signal i. For example, if high-order 5 bits are "P7U", i=0 to 31.

The interpolation signal generating means 12 generates an interpolation signal that is used to generate an interpolation pattern on the basis of the input image signal P7. In this embodiment, low-order bits P7L of the input image signal P7 are assigned to the interpolation signal. For example, if low-order 3 bits are "P7L", P7L=0 to 7.

The screen pattern table read-out means 14 reads out screen patterns S[i] and S[i+1] corresponding to the screen pattern select signal i.

Figure 2:
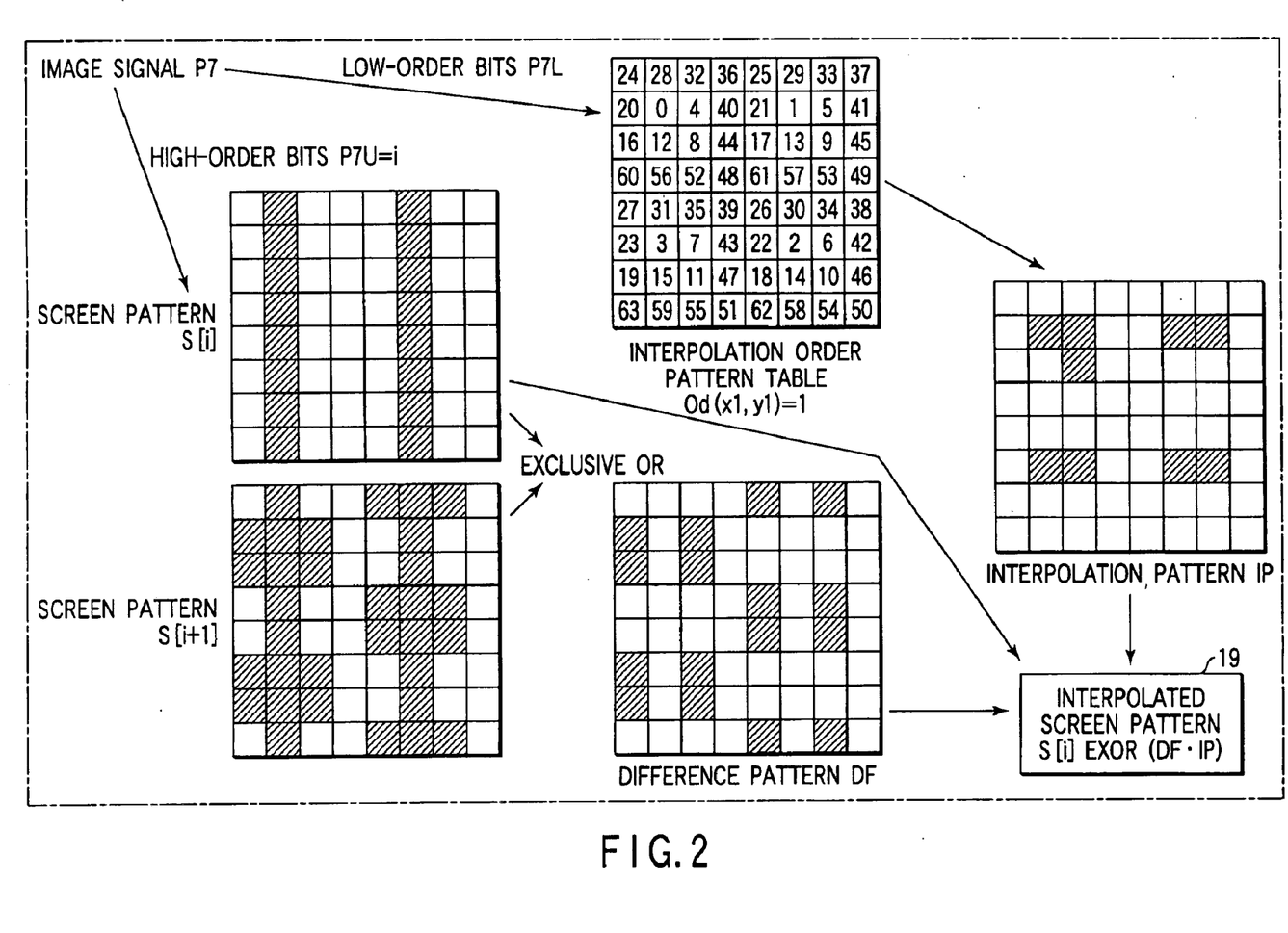
FIG. 2 illustrates the outline of a process for generating a difference pattern DF and an interpolation pattern IP.

FIG. 2 shows examples of screen pattern S[i] and screen pattern S[i+1].

The difference pattern DF producing means 15 receives the read-out screen pattern S[i] and screen pattern S[i+1] and produces a difference pattern DF(xla, yla) on the basis of the following equation:

$$DF(xla, yla) = S[i](xla, yla) \text{ EXOR } S[i+1](xla, yla)$$

where EXOR is Exclusive OR.

FIG. 2 shows an example of the difference pattern DF.

The interpolation order pattern table 16 shows the order in which a binary interpolation pattern IP is formed two-dimensionally in accordance with the interpolation signal P7L.

FIG. 2 shows an example of the interpolation order pattern table Od(xla, yla) 16. In this example, the interpolation order pattern table Od(xla, yla) has the same size as the screen pattern. Values indicative of the order of 0 to nm−1 are assigned to the respective pixels in the interpolation order pattern table Od(xla, yla).

The interpolation order pattern in the interpolation order pattern table 16 is set or changed by the CPU (not shown).

Based on the interpolation signal P7L and interpolation order pattern table Od(xla, yla) 16, the interpolation pattern generating means 17 generates an interpolation pattern IP(xla, yla) according to the following processing:

```
dj = (2 ^ 3)/(n*m) * P7L;
for(xla=0;xla<n;xla++) {
    for(yla=0;yla<m;yla++) {
        if(dj>Od(xla,yla)) {IP(xla,yla)=1;}
        else{IP(xla,yla)=0;}
    }
}
```

FIG. 2 shows an example of the interpolation pattern IP(xla,yla).

The intra-pattern position calculation means 18 calculates an intra-pattern position (xl, yl) on the basis of image coordinates (main-scan coordinate x, sub-scan coordinate y) according to the following equations:

$$xl = (x + y/m * xds) \% n$$

$$yl = y \% m$$

where xds indicates a skew in the screen pattern main-scan direction, which is used to provide a screen angle.

The interpolation calculation means 19 produces, based on the following equation, a tone process output (binary signal) P8=0 or 1, which is determined from a screen pattern that is obtained by spatially interpolating S[i] and S[i+1]:

$$P8 = S[i](xl,yl) \text{ EXOR } (DF(xl,yl) \text{ AND } IP(xl,yl)).$$

Figure 3:
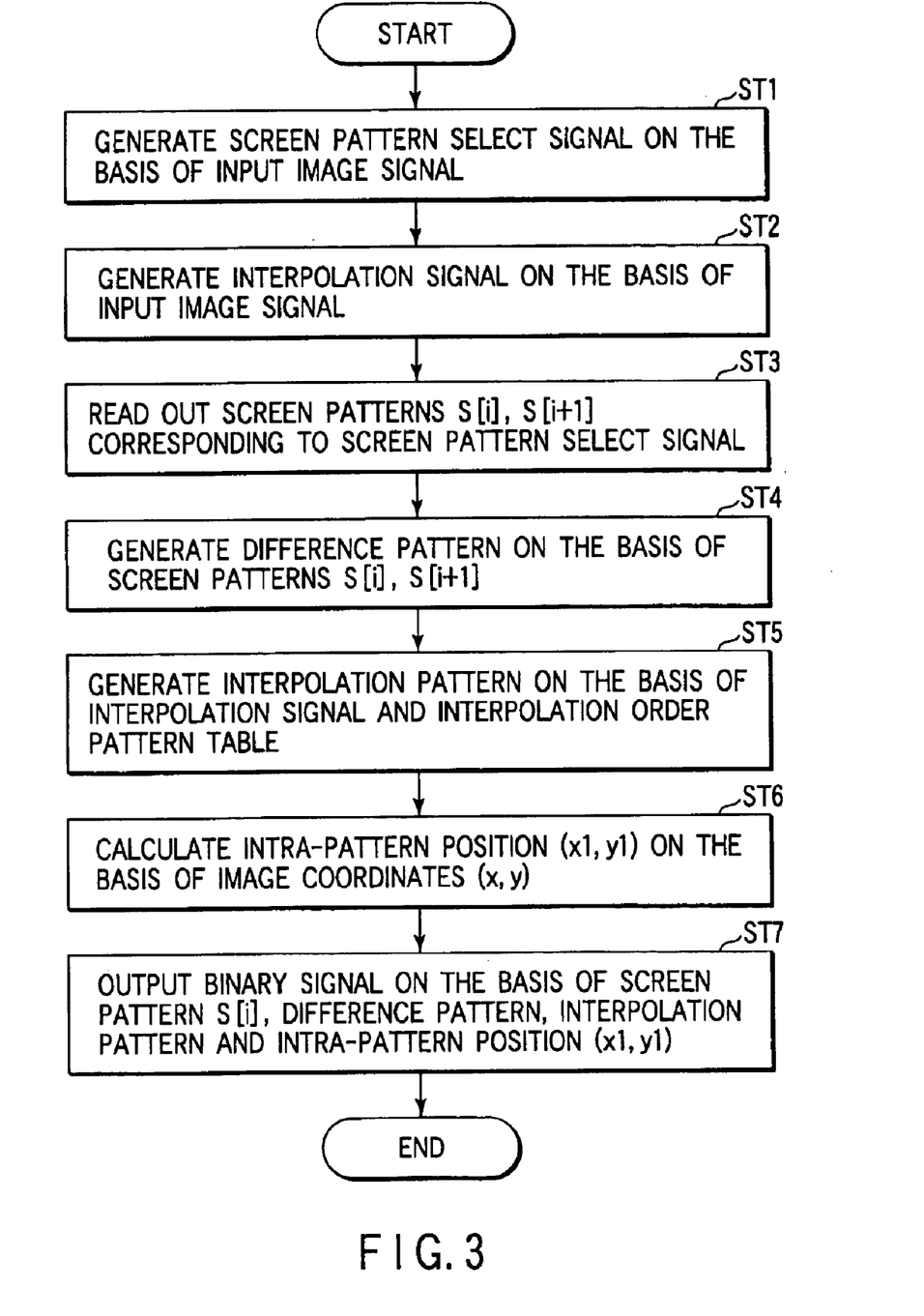
FIG. 3 is a flow chart illustrating an image process in the image processing apparatus.

The image processing in the image processing apparatus 1 with the above structure is described referring to the flow chart of FIG. 3.

The screen pattern select signal generating means 11 generates a screen pattern select signal i on the basis of the input image signal P7 delivered from the image input means 100 (ST1).

At the same time, the interpolation signal generating means 12 generates an interpolation signal P7L on the basis of the input image signal P7 delivered from the image input means 100 (ST2).

Subsequently, the screen pattern table read-out means 14 reads out screen patterns S[i] and S[i+1] corresponding to the screen pattern select signal i that has been generated by the screen pattern select signal generating means 11 (ST3).

The difference pattern DF producing means 15 produces a difference pattern DF on the basis of the screen pattern S[i] and screen pattern S[i+1] read out by the screen pattern table read-out means 14 (ST4).

Based on the interpolation signal P7L generated from the interpolation signal generating means 12 and the interpolation order pattern table 16, the interpolation pattern generating means 17 generates an interpolation pattern IP (ST5).

The intra-pattern position calculation means 18 calculates the intra-pattern position (xl, yl) on the basis of image coordinates (main-scan coordinate x, sub-scan coordinate y) (ST6).

Finally, the interpolation calculation means 19 produces a binary signal P8, which is determined from the input screen pattern S[i], difference pattern DF, interpolation pattern IP and intra-pattern position (xl, xl) (ST7).

In this manner, the input image signal P7 from the image input means 100 is subjected to the tone process in the image processing apparatus 1 and output to the image output means 200 as the binary signal P8.

The image output means 200 produces an image on the paper on the basis of the binary signal P8.

A second embodiment of the invention will now be described.

Figure 4:
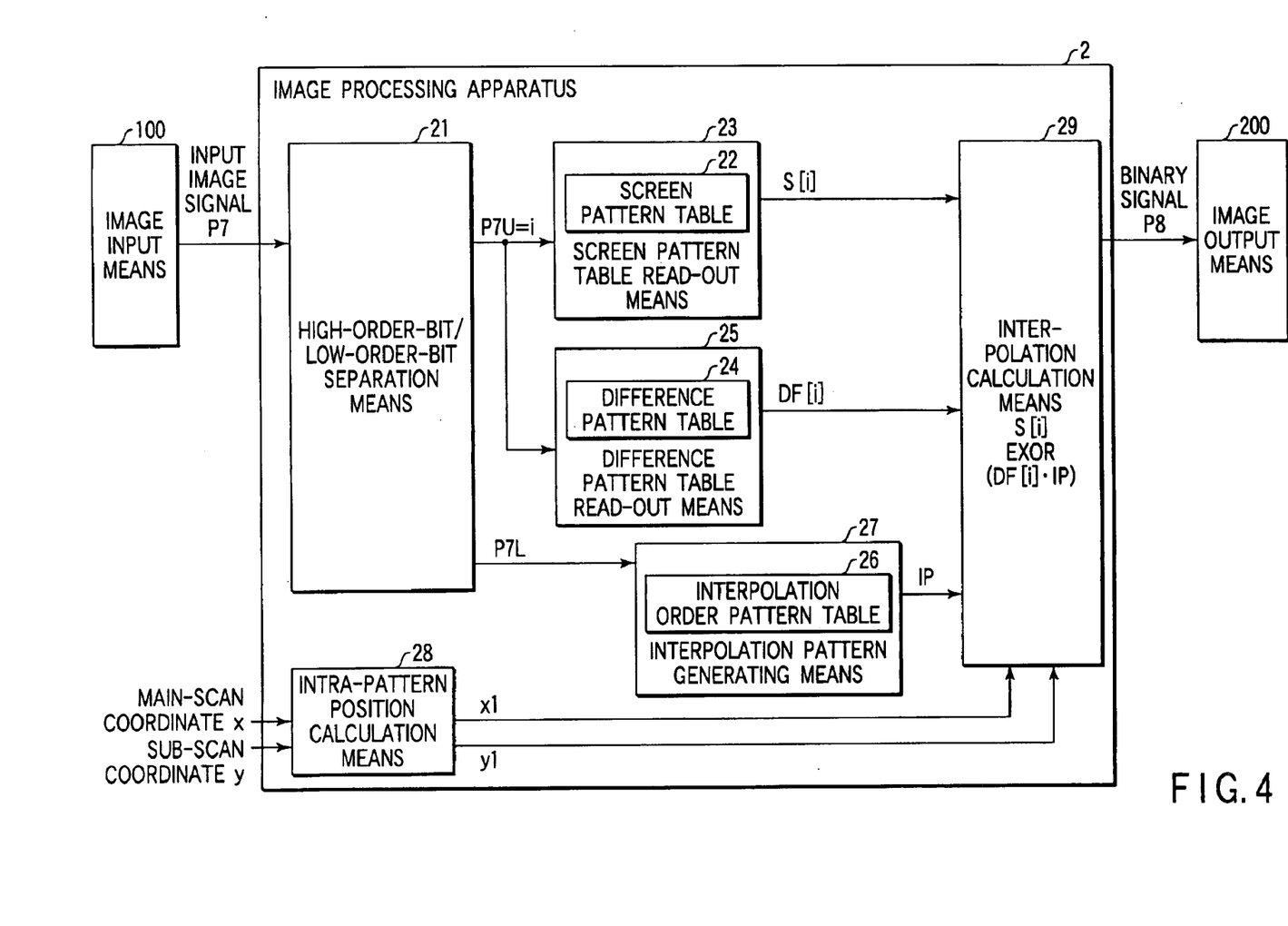
FIG. 4 is a block diagram showing an internal structure of an image processing apparatus according to a second embodiment of the present invention.

FIG. 4 shows the structure of an image processing apparatus 2 according to the second embodiment.

The image processing apparatus 2 comprises high-order-bit/low-order-bit separation means 21, a screen pattern table 22, screen pattern table read-out means 23, a difference pattern table 24 & difference pattern table read-out means 25, an interpolation order pattern table 26 & interpolation pattern generating means 27, intra-pattern position calculation means 28, and interpolation calculation means 29.

The image processing apparatus 2 of this embodiment executes the tone process after the input image signal P7 is subjected to image processing (not shown) such as image-quality adjustment and compression/decompression in the preceding stage of the above-described structure.

In the second embodiment, the difference pattern DF producing means 15 shown in FIG. 1 is configured as a table in advance. In the first embodiment, the difference pattern DF is generated from the screen patterns S[i] and S[i+1]. In the second embodiment, difference patterns corresponding to the screen pattern select signal i are prestored in the difference pattern table DF[i](xla, yla) 24.

The high-order-bit/low-order-bit separation means 21 produces high-order bits P7U of the input image signal P7, which is an 8-bit signal, as a screen select signal i, and also produces low-order bits P7L of the input image signal P7.

The screen pattern table 22 and screen pattern table read-out means 23 are the same as the screen pattern table 13 and screen pattern table read-out means 14, so a description thereof is omitted.

The difference pattern table read-out means 25 refers to the difference pattern table 24 and reads out the difference pattern DF[i] corresponding to the screen pattern select signal i.

In the difference pattern table 24, difference patterns are set or changed by the CPU (not shown).

The interpolation order pattern table 26 and interpolation pattern generating means 27 are the same as the interpolation order pattern table 16 and interpolation pattern generating means 17, so a description thereof is omitted.

The intra-pattern position calculation means 28 is the same as the intra-pattern position calculation means 18, so a description thereof is omitted.

The interpolation calculation means 29 produces, based on the following equation, a tone process output (binary signal) P8=0 or 1:

$$P8=S[i](xl,yl) \text{ EXOR } (DF(xl,yl) \text{ AND } IP(xl,yl)).$$

In this manner, the input image signal P7 from the image input means 100 is subjected to the toning process in the image processing apparatus 2 and output to the image output means 200 as the binary signal P8.

The image output means 200 produces an image on the paper on the basis of the binary signal P8.

A third embodiment of the invention will now be described.

Figure 5:
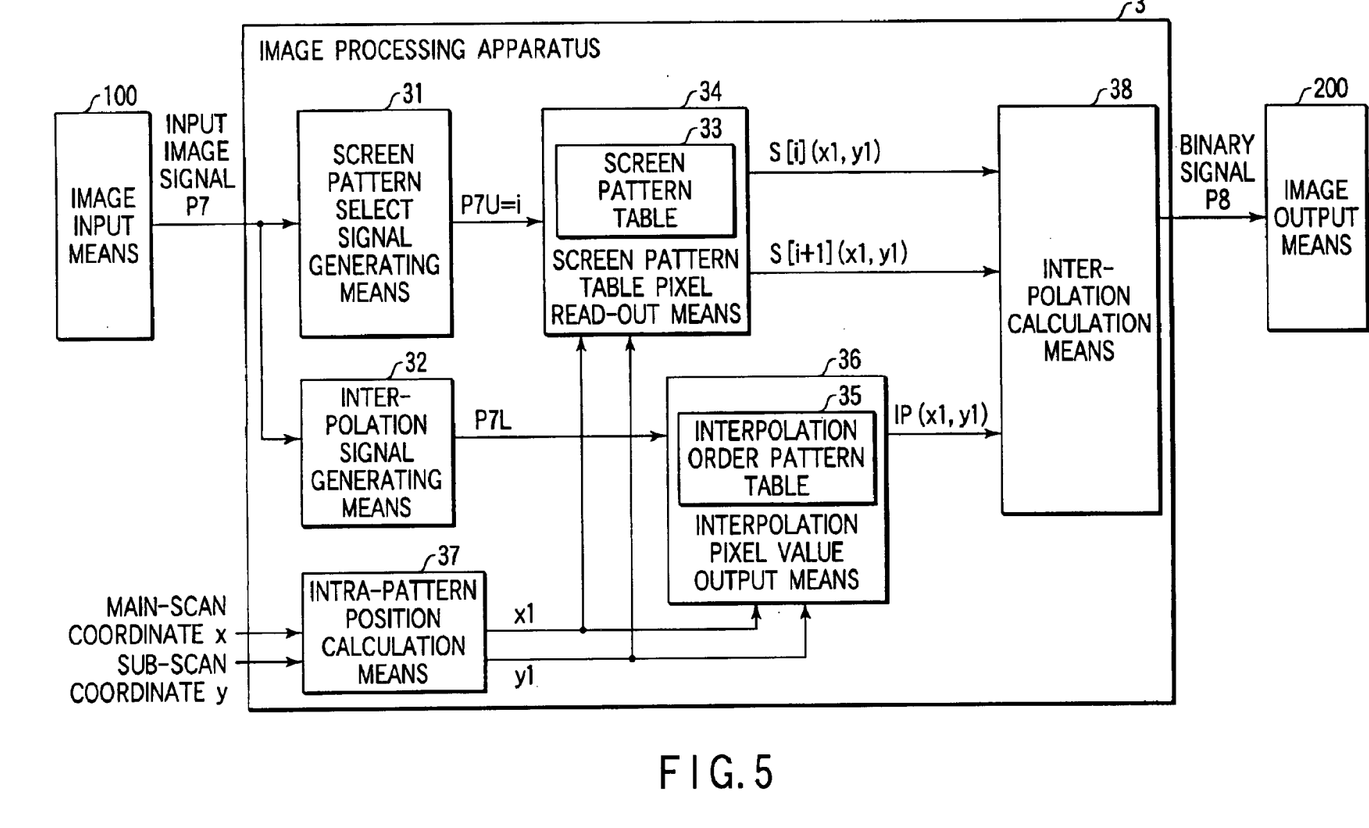
FIG. 5 is a block diagram showing an internal structure of an image processing apparatus according to a third embodiment of the present invention.

FIG. 5 shows the structure of an image processing apparatus 3 according to the third embodiment.

The image processing apparatus 3 comprises screen pattern select signal generating means 31, interpolation signal generating means 32, a screen pattern table 33 & screen pattern table pixel read-out means 34, an interpolation order pattern table 35 & interpolation pixel value output means 36, intra-pattern position calculation means 37, and interpolation calculation means 38.

The image processing apparatus 3 of this embodiment executes the tone process after the input image signal P7 is subjected to image processing (not shown) such as image-quality adjustment and compression/decompression in the preceding stage of the above-described structure.

The screen pattern select signal generating means 31, interpolation signal generating means 32, screen pattern table 33, interpolation order pattern table 35 and intra-pattern position calculation means 37 are the same as those in the first embodiment shown in FIG. 1, so a description thereof is omitted.

The screen pattern table pixel read-out means 34 refers to the screen pattern table 33, and outputs a pixel value S[i](xl, yl) and a pixel value S[i+1](xl, yl) in the two screen patterns S[i] and S[i+1] corresponding to the screen pattern select signal i, these pixel values being associated with output coordinates (xl, yl) delivered from the intra-pattern position calculation means 37.

The interpolation pixel value output means 36 outputs an interpolation pixel value IP(xy, yl) corresponding to the intra-pattern pixel position (xl, yl) on the basis of the following equation:

$$dj=(2\hat{\ }3)/(n*m)*P7L;$$

if(dj>Od(xl,yl)){IP(xl,yl)=1;}
else{IP(xla,yla)=0;}

The interpolation calculation means 38 calculates a binary signal P8 by a logic operation on the basis of the pixel value S[i](xl,yl), pixel value S[i+1](xl,yl) and interpolation pixel value IP(xl,yl).

An example of the logic formula for calculating the output value P8 is:

$$P8=(S[i](xl,yl) \text{ and } S[i+1](xl,yl)) \text{ or } (S[i](xl,yl) \text{ and } IP(xl,yl)) \text{ or } ((\text{not } S[i](xl,yl)) \text{ and } S[i+1](xl,yl) \text{ and } IP(xl,yl)).$$

In this manner, the input image signal P7 from the image input means 100 is subjected to the tone process in the image processing apparatus 3 and output to the image output means 200 as the binary signal P8.

The image output means 200 produces an image on the paper on the basis of the binary signal P8.

As has been described above, according to the embodiments of the present invention, only the pattern information corresponding to a specific signal within the signal range is stored, and two upper and lower screen patterns corresponding to the input image signal value are spatially interpolated where necessary. Thereby, the binary screen pattern for the input image signal value can be generated.

The intra-pattern position (xl, yl) is calculated on the basis of the main-scan and sub-scan coordinates (x, y), and the corresponding values in the interpolated binary screen pattern are read out and output.

In the above embodiments, the digital copying machine having the image processing has been described by way of example. However, this invention is also applicable to printers.

In addition, in the above embodiments, the scanner has been described as an example of the image input means. Alternatively, image data may be received from an external device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

first signal generating means for generating a first signal on the basis of an input image signal;

first memory means for storing a plurality of pattern data;

read-out means for reading out first and second patterns stored in the first memory means, in accordance with the first signal generated from the first signal generating means;

third pattern producing means for producing a third pattern on the basis of the first and second patterns read out by the read-out means;

second signal generating means for generating a second signal on the basis of the image signal;

second memory means for prestoring a fourth pattern;

fifth pattern generating means for generating a fifth pattern on the basis of the fourth pattern stored in the second memory means and the second signal generated from the second signal generating means;

position calculation means for calculating an intra-pattern position signal indicative of a position within the patterns; and interpolation calculation means for calculating, in accordance with the intra-pattern position signal calculated by the position calculation means, an output pixel value on the basis of a first pixel value within the first pattern corresponding to the intra-pattern position, a second pixel value within the third pattern corresponding to the intra-pattern position, and a third pixel value within the fifth pattern corresponding to the intra-pattern position.

2. The image processing apparatus according to claim 1, wherein the first signal generating means is select signal generating means for generating a select signal on the basis of the input image signal.

3. The image processing apparatus according to claim 2, wherein the select signal generating means assigns high-order bits of the input image signal to the select signal.

4. The image processing apparatus according to claim 1, wherein the first memory means is a pattern table that prestores a plurality of pattern data expressed by binary values with specified vertical and horizontal dimensions.

5. The image processing apparatus according to claim 1, wherein the third pattern producing means is difference pattern producing means for producing a difference pattern on the basis of the first and second patterns read out by the read-out means.

6. The image processing apparatus according to claim 5, wherein the difference pattern producing means produces a difference pattern $DF(xla, yla)$ according to the equation, $$DF(xla, yla) = S[i](xla, yla) \text{ EXOR } S[i+1](xla, yla)$$

where $S[i]$ is the first pattern, $S[i+1]$ is the second pattern, and EXOR is Exclusive OR.

7. The image processing apparatus according to claim 5, wherein the difference pattern producing means is provided with a table prestoring a plurality of difference patterns, and selects and outputs a difference pattern in accordance with the select signal generated by the select signal generating means.

8. The image processing apparatus according to claim 1, wherein the second signal generating means is interpolation signal generating means for generating an interpolation signal on the basis of the image signal.

9. The image processing apparatus according to claim 1, wherein the second memory means is an interpolation order pattern table prestoring an interpolation order pattern.

10. The image processing apparatus according to claim 1, wherein the fifth pattern generating means is interpolation pattern generating means for generating an interpolation pattern on the basis of an interpolation order pattern and an interpolation signal.

11. The image processing apparatus according to claim 10, wherein the interpolation pattern generating means generates an interpolation pattern $IP(xla, yla)$ according to the equation,

```
dj = (2 ^ b)/(n*m) * P7L;
for(xla=0;xla<n;xla++) {
    for(yla=0;yla<m;yla++) {
        if(dj>Od(xla,yla) {IP(xla,yla)=1;}
        else{IP(xla,yla)=0;}
    }
}
``` where P7L is the interpolation signal, $Od(xla, yla)$ is the interpolation order pattern, and b is a bit width which is one of 2, 3 and 4.

12. The image processing apparatus according to claim 1, wherein the position calculation means calculates an intra-pattern position signal indicative of a position within the pattern on the basis of a main-scan sync signal and a sub-scan sync signal of the image signal.

13. The image processing apparatus according to claim 1, wherein the interpolation order pattern stored in the second memory means has the same vertical/horizontal dimensions as the pattern stored in the first memory means.

14. The image processing apparatus according to claim 1, wherein the position calculation means calculates an intra-pattern position on the basis of image coordinates (x, y) of the image signal according to the following equation, $$xl = (x + y/m * xds) \% n$$

$$yl = y \% m$$

where xds indicates a skew in a screen pattern main-scan direction.

15. The image processing apparatus according to claim 1, wherein the interpolation calculation means calculates an output pixel value according to the equation, $$P8 = S[i](xl,yl) \text{ EXOR } (DF(xl,yl) \text{ AND } IP(xl,yl))$$

where $S[i](xl,yl)$ is the first pixel value, $DF(xl,yl)$ is the second pixel value, $IP(xl,yl)$ is the third pixel value, and EXOR is Exclusive OR.

16. An image processing apparatus comprising:

select signal generating means for generating a select signal on the basis of an input image signal;

first memory means for prestoring a plurality of screen pattern data expressed by binary values with specified vertical/horizontal dimensions;

position calculation means for calculating an intra-pattern position signal indicative of a position within the screen pattern, on the basis of a main-scan sync signal and a sub-scan sync signal of the image signal;

read-out means for reading out first and second patterns stored in the first memory means, in accordance with the select signal generated from the select signal generating means, and reading out a first pixel value within the first screen pattern corresponding to the intra-pattern position and a second pixel value within the second screen pattern corresponding to the intra-pattern position;

interpolation signal generating means for generating an interpolation signal on the basis of the image signal;

second memory means for prestoring an interpolation order pattern;

output means for generating an interpolation pattern on the basis of the interpolation order pattern stored in the second memory means and the interpolation signal generated by the interpolation signal generating means, and outputting a binary interpolation pixel value in accordance with the intra-pattern position signal calculated by the position calculation means; and interpolation calculation means for calculating an output pixel value by a logic operation on the basis of the first pixel value and second pixel value read out by the read-out means and the interpolation pixel value output from the output means.

17. The image processing apparatus according to claim 16, wherein the interpolation calculation means is:

((first pixel value) and (second pixel value)) or ((first pixel value) and (not(interpolation pixel value))) or ((not first pixel value) and (second pixel value) and (interpolation pixel value)).

18. An image processing method comprising:

generating a first signal on the basis of an input image signal;

prestoring a plurality of pattern data;

reading out first and second patterns from the prestored plurality of pattern data in accordance with the generated first signal;

producing a third pattern on the basis of the read-out first and second patterns;

generating a second signal on the basis of the image signal;

prestoring a fourth pattern;

generating a fifth pattern on the basis of the prestored fourth pattern and the generated second signal;

calculating an intra-pattern position signal indicative of a position within the patterns; and calculating, in accordance with the calculated intra-pattern position signal, an output pixel value on the basis of a first pixel value within the first pattern corresponding to the intra-pattern position, a second pixel value within the third pattern corresponding to the intra-pattern position, and a third pixel value within the fifth pattern corresponding to the intra-pattern position.

19. The image processing method according to claim 18, wherein a table prestoring a plurality of difference patterns is provided, and a difference pattern is selected and output in accordance with the generated first signal.

20. The image processing method according to claim 18, further comprising reading out the first pixel value and second pixel value in accordance with the intra-pattern position signal relative to the first and second patterns, outputting an interpolation pixel value in accordance with the intra-pattern position signal relative to the fifth pattern, and calculating an output pixel value by a logic operation on the basis of the first pixel value, the second pixel value and the interpolation pixel value.

* * * * *